United States Patent
Williams et al.

(10) Patent No.: US 11,529,854 B1
(45) Date of Patent: Dec. 20, 2022

(54) TONNEAU COVER WITH SHIELDABLE INTERIOR MOUNTING FEATURES

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US)

(73) Assignee: Toyota Motor Engineering & Manufactuting North America, Inc., Plano, TX (US)

(*) Notice: Subject to any disclaimer, the term of this patent is extended or adjusted under 35 U.S.C. 154(b) by 0 days.

(21) Appl. No.: 17/344,399

(22) Filed: Jun. 10, 2021

(51) Int. Cl.
| | |
|---|---|
| *B60J 7/14* | (2006.01) |
| *B60J 7/16* | (2006.01) |
| *B60J 7/11* | (2006.01) |
| *B60R 11/00* | (2006.01) |

(52) U.S. Cl.
CPC ............. *B60J 7/141* (2013.01); *B60J 7/11* (2013.01); *B60J 7/1607* (2013.01); *B60R 11/00* (2013.01); *B60R 2011/004* (2013.01); *B60R 2011/0071* (2013.01)

(58) Field of Classification Search
CPC ... B60J 7/11; B60J 7/141; B60J 7/1607; B60J 7/1621; B60R 11/00; B60P 7/02; B60P 7/06
USPC .......................... 296/100.02, 100.06, 100.09
See application file for complete search history.

(56) References Cited

U.S. PATENT DOCUMENTS

| | | | |
|---|---|---|---|
| 5,094,375 A | 3/1992 | Wright | |
| 5,372,289 A | 12/1994 | Dachicourt | |
| 5,611,414 A | 3/1997 | Walker | |
| 6,092,852 A | 7/2000 | Lawrence | |
| 6,276,735 B1 | 8/2001 | Champion | |
| 6,302,468 B1 | 10/2001 | Steadman | |
| 6,435,586 B2 | 8/2002 | Getzschman et al. | |
| 6,513,851 B2 | 2/2003 | Henderson | |
| 6,585,309 B2 | 7/2003 | Dicke | |
| 6,607,229 B1 * | 8/2003 | McIntosh ............... | B62D 33/00 296/26.06 |
| 6,634,691 B2 | 10/2003 | Henderson | |
| 6,712,418 B1 | 3/2004 | Lathers | |
| 6,827,389 B1 | 12/2004 | Pandorf | |
| 6,929,303 B1 | 8/2005 | Sharples | |
| 8,210,591 B2 | 7/2012 | Martin | |
| 8,979,157 B2 | 3/2015 | Nelson | |
| 9,026,329 B2 | 5/2015 | Shultz et al. | |
| 9,487,248 B1 | 11/2016 | Buckhalt et al. | |
| 9,649,919 B2 | 5/2017 | Daniel | |

(Continued)

*Primary Examiner* — Jason S Daniels
(74) *Attorney, Agent, or Firm* — Christopher G. Darrow; Darrow Mustafa PC

(57) ABSTRACT

A detachable tonneau cover panel assembly for a vehicle tonneau cover includes a panel portion structured to be detachably connectible to a panel of a tonneau cover, and at least one mounting bracket attached to an interior side of the panel portion and structured to enable mounting of an object thereon. An optional shield may be attached to the panel portion to enclose and protect object(s) mounted on the mounting bracket(s). The tonneau cover panel assembly is structured to be easily detachable from other panels of the tonneau cover and man-portable so that a user may use the tonneau cover panel assembly as a carrying case for any objects mounted on the mounting brackets attached to the panel portion.

6 Claims, 5 Drawing Sheets

(56) References Cited

U.S. PATENT DOCUMENTS

| | | |
|---|---|---|
| 9,682,733 B2 | 6/2017 | Krishnan et al. |
| 10,252,676 B2 | 4/2019 | Rossi |
| 10,384,522 B2 | 8/2019 | Yilma et al. |
| 10,435,082 B1 | 10/2019 | Kupina et al. |
| 2020/0215889 A1 | 7/2020 | Rossi et al. |
| 2020/0406730 A1 | 12/2020 | Fournier et al. |
| 2021/0155088 A1* | 5/2021 | Amble .................... B60J 7/14 |
| 2022/0126659 A1* | 4/2022 | Delaney ................. B60P 7/02 |

* cited by examiner

TONNEAU COVER WITH SHIELDABLE INTERIOR MOUNTING FEATURES

TECHNICAL FIELD

The subject matter described herein relates in general to vehicle tonneau covers and, more particularly, to a tonneau cover formed from multiple panels including a panel which is detachable from the tonneau cover and has features enabling mounting of objects to an interior side the detachable panel.

BACKGROUND

Users may load items into a cargo bed of a pickup truck for transport. Frequently, the user may wish to transport relatively fragile or breakable items in the cargo bed. However, the addition of fragile or breakable items to the cargo bed on top of (or positioned between) other cargo items may result in damage to the fragile items due to shifting of cargo during transport and movement of cargo due to vehicle interactions with bumps and potholes in the road surface.

SUMMARY OF THE INVENTION

In one aspect of the embodiments described herein, a detachable tonneau cover panel assembly for a vehicle tonneau cover is provided. The tonneau cover panel assembly includes a panel portion structured to be detachably connectible to a panel of a tonneau cover, and at least one mounting bracket attached to an interior side of the panel portion and structured to enable mounting of an object thereon.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Figure 1:
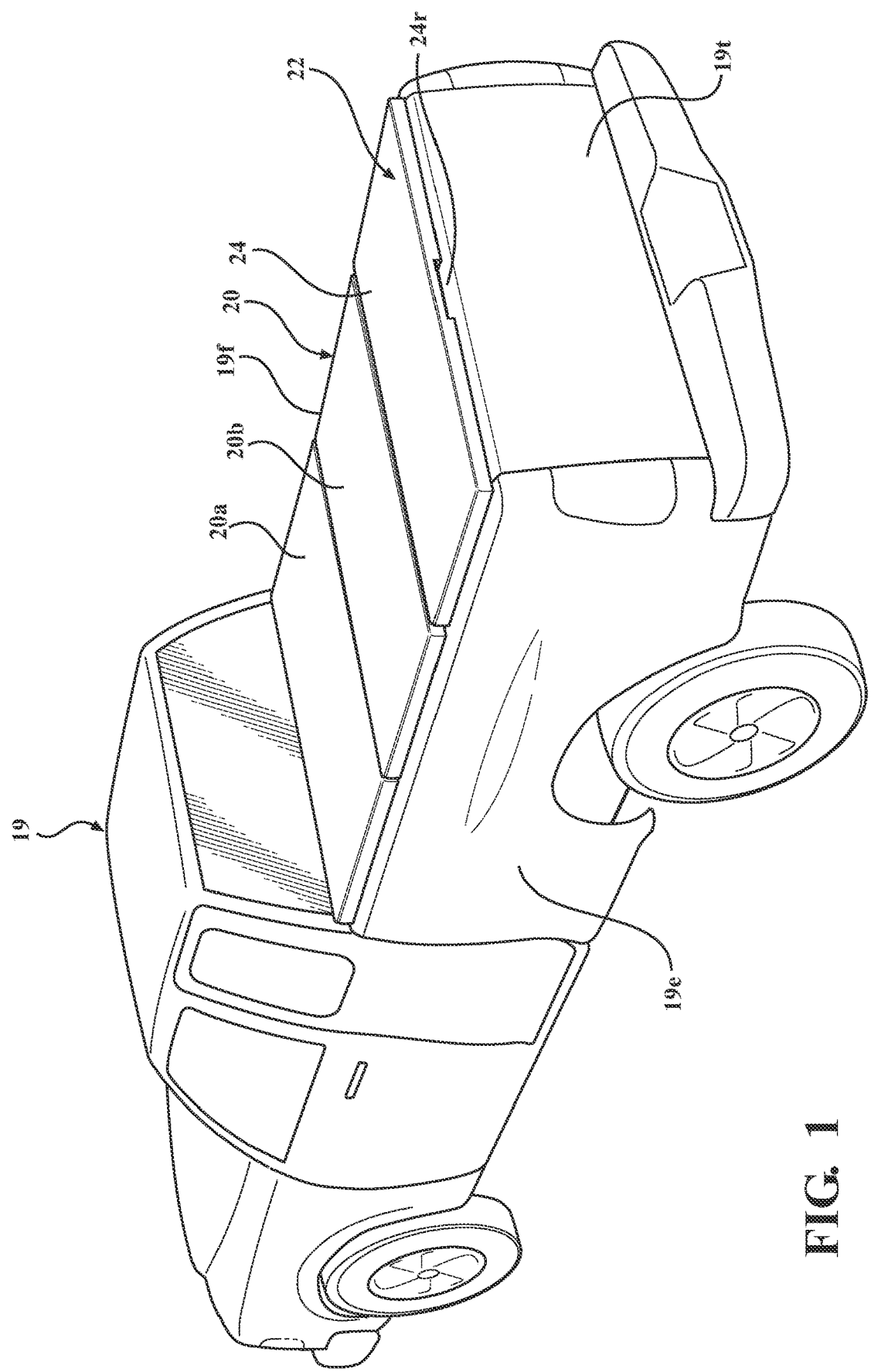
FIG. 1 is a schematic perspective view of a vehicle with a tonneau cover mounted thereon, the tonneau cover including a detachable tonneau cover panel assembly in accordance with an embodiment described herein.
Figure 2:
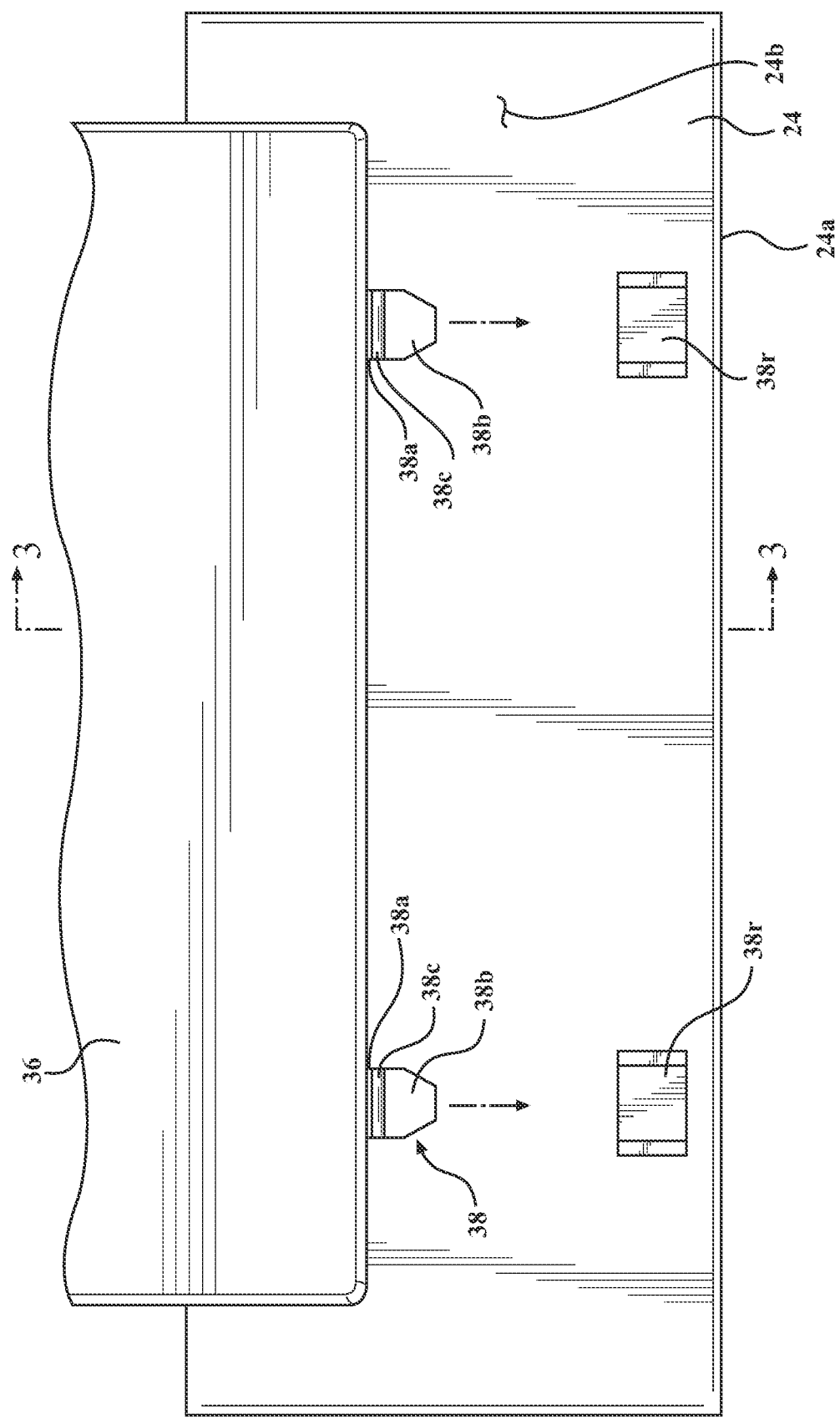
FIG. 2 is a schematic exploded plan view illustrating detachable connection of an embodiment of a shield to an interior surface of a panel portion of a detachable tonneau cover panel assembly.
Figure 2A:
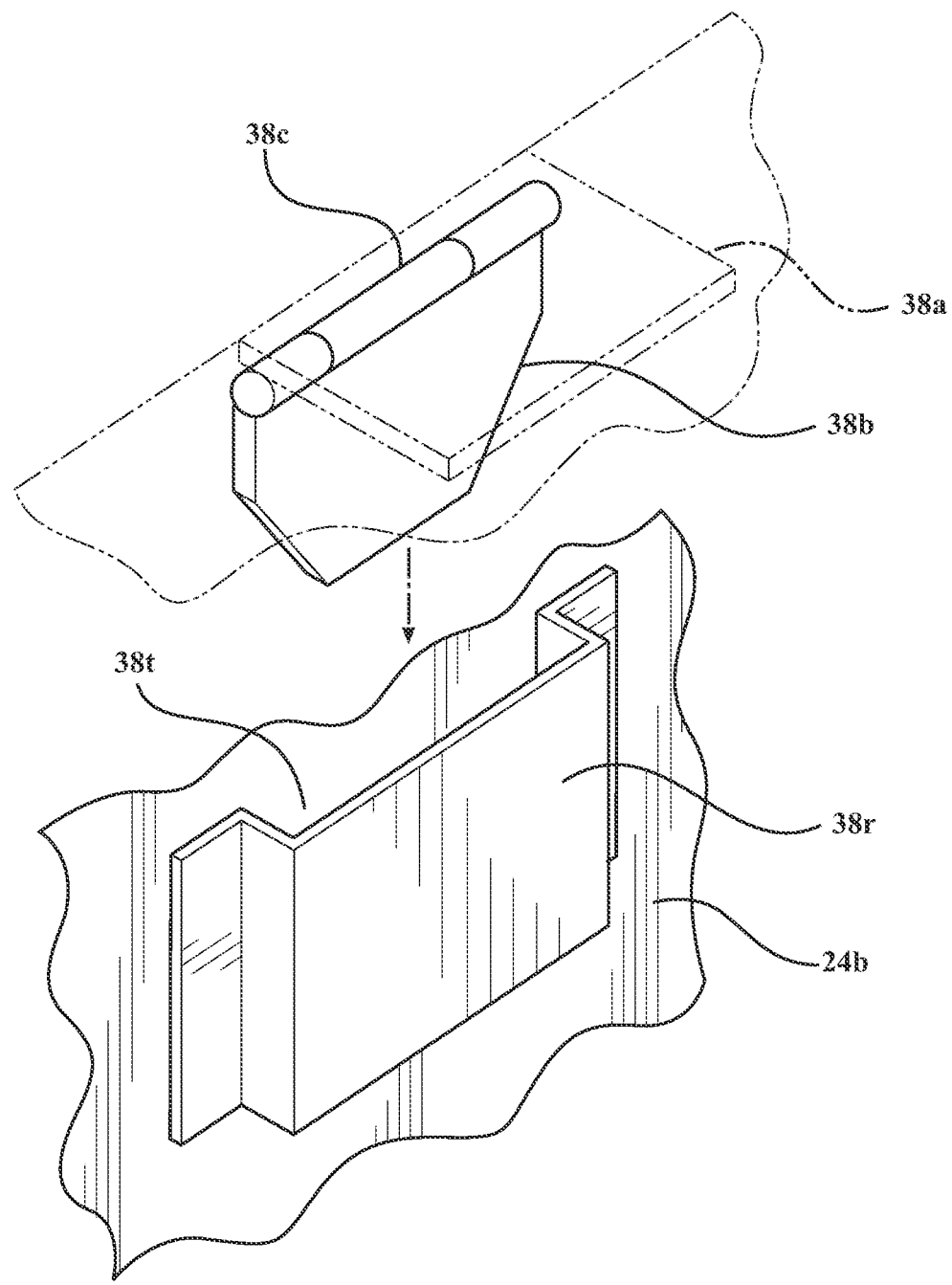
FIG. 2A is a magnified view of a portion of FIG. 2 showing how a hinge plate may be inserted into a hinge receptacle and removed from the hinge receptacle to attach the shield to the panel portion.

In one or more arrangements described herein, a tonneau cover includes a detachable panel cover panel assembly. The tonneau cover panel assembly includes a panel portion structured to be detachably connectible to a panel of a tonneau cover, and at least one mounting bracket attached to an interior side of the panel portion and structured to enable mounting of an object thereon. The interior side of the panel portion faces toward a floor of a vehicle cargo bed when the tonneau cover is mounted on a vehicle (such as a pickup truck) so as to cover the cargo bed. Thus, object(s) mounted on the mounting bracket(s) are suspended above the floor of the cargo bed for transport. An optional shield may be attached to the panel portion to enclose and protect object(s) mounted on the mounting bracket(s). The tonneau cover panel assembly is structured to be easily detachable from other panels of the tonneau cover and man-portable so that a user may use the tonneau cover panel assembly as a carrying case for any objects mounted on the mounting brackets attached to the panel portion.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements and/or features. In addition, similar reference numerals in different figures refer to elements common to the different figures. Also, numerous specific details are set forth in order to provide a thorough understanding of the embodiments described herein. However, it will be understood by those of ordinary skill in the art that the embodiments described herein can be practiced without these specific details.

FIG. 1 is a schematic perspective view of a vehicle 19 with a tonneau cover 20 mounted thereon. The vehicle 19 shown is in the form of a pickup truck. In a known manner, the pickup truck 19 may define a cargo bed 19a bounded by a front wall (not shown), a pair of opposed side walls 19e and 19f, and a tailgate 19t which may be opened and closed to provide access to the cargo bed 19a.

The tonneau cover 20 may be configured for covering the cargo bed 19c, to protect contents of the cargo bed from the elements and to restrict access to the contents of the cargo bed. The tonneau cover 20 may be formed from a plurality of panels 20a, 20b, 22 which are attached to each other so as to enable the panels to be folded with respect to each other when one or more of the panels is not being used to cover a portion of the cargo bed 19a. The tonneau cover and each of its constituent panels 20a, 20b, 22 may be structured to be mountable on tops of the cargo bed front wall, opposed walls 19e, 19f, and/or tailgate 19t in order to cover the cargo bed 19a.

The tonneau cover 20 may include a detachable tonneau cover panel assembly 22 in accordance with an embodiment described herein. In embodiments described herein, the detachable tonneau cover panel assembly 22 may form a constituent panel of the tonneau cover 20. In one or more arrangements, the tonneau cover panel assembly 22 may include a panel portion 24 structured to be detachably connectible to at least one other panel of the tonneau cover 20. "Detachably connectible" means that the tonneau cover panel assembly 22 may be connected to and detached or disconnected from at least one other panel of the tonneau cover by a user as a feature of normal use of the tonneau cover 20 (i.e., that the tonneau cover panel assembly 22 is not (and is not intended to be) permanently attached to the at least one other panel of the tonneau cover).

Figure 3:
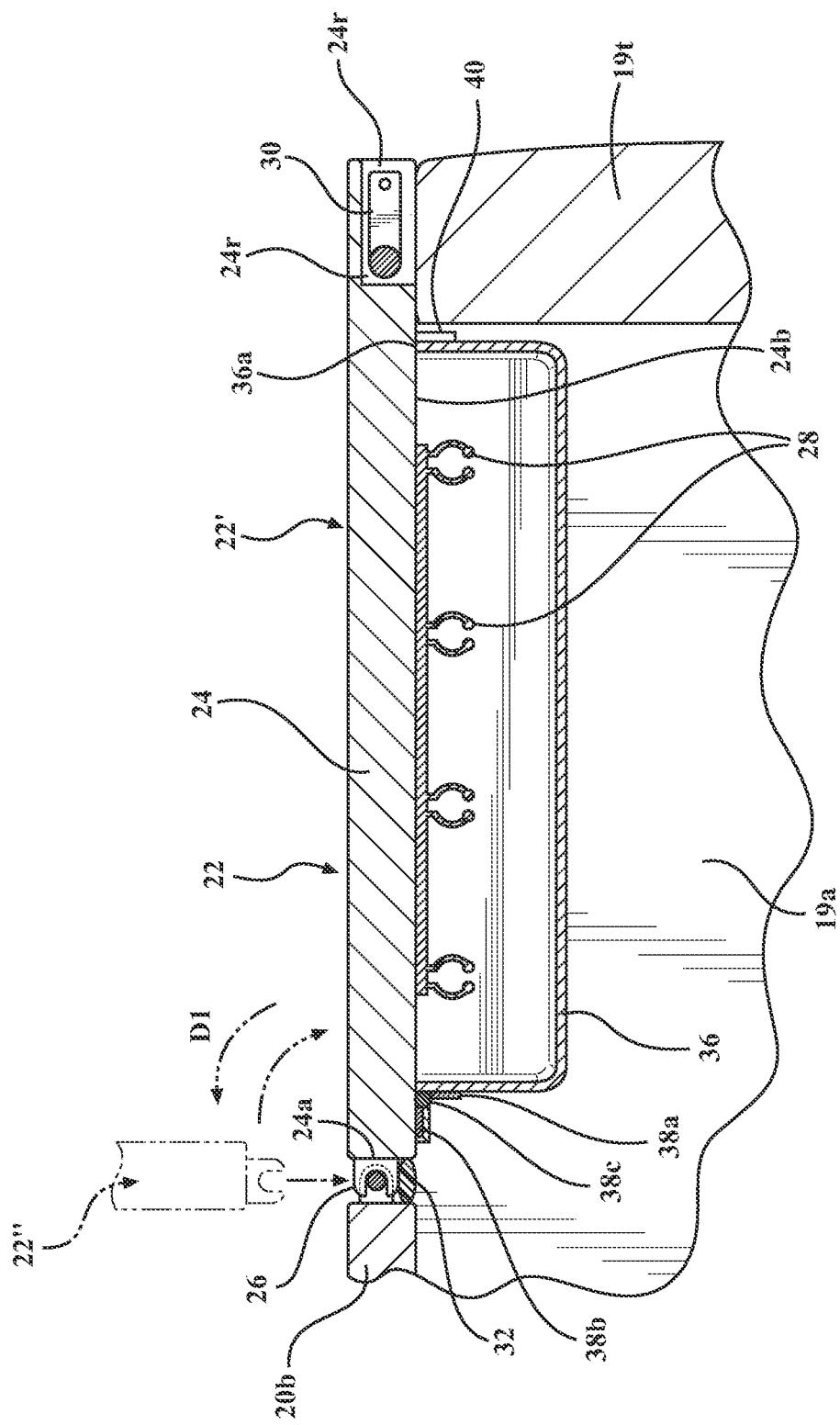
FIG. 3 is a schematic side cross-sectional view of the detachable tonneau cover panel assembly of FIG. 2 showing attachment of mounting brackets to an interior side of the panel portion.
Figure 4:
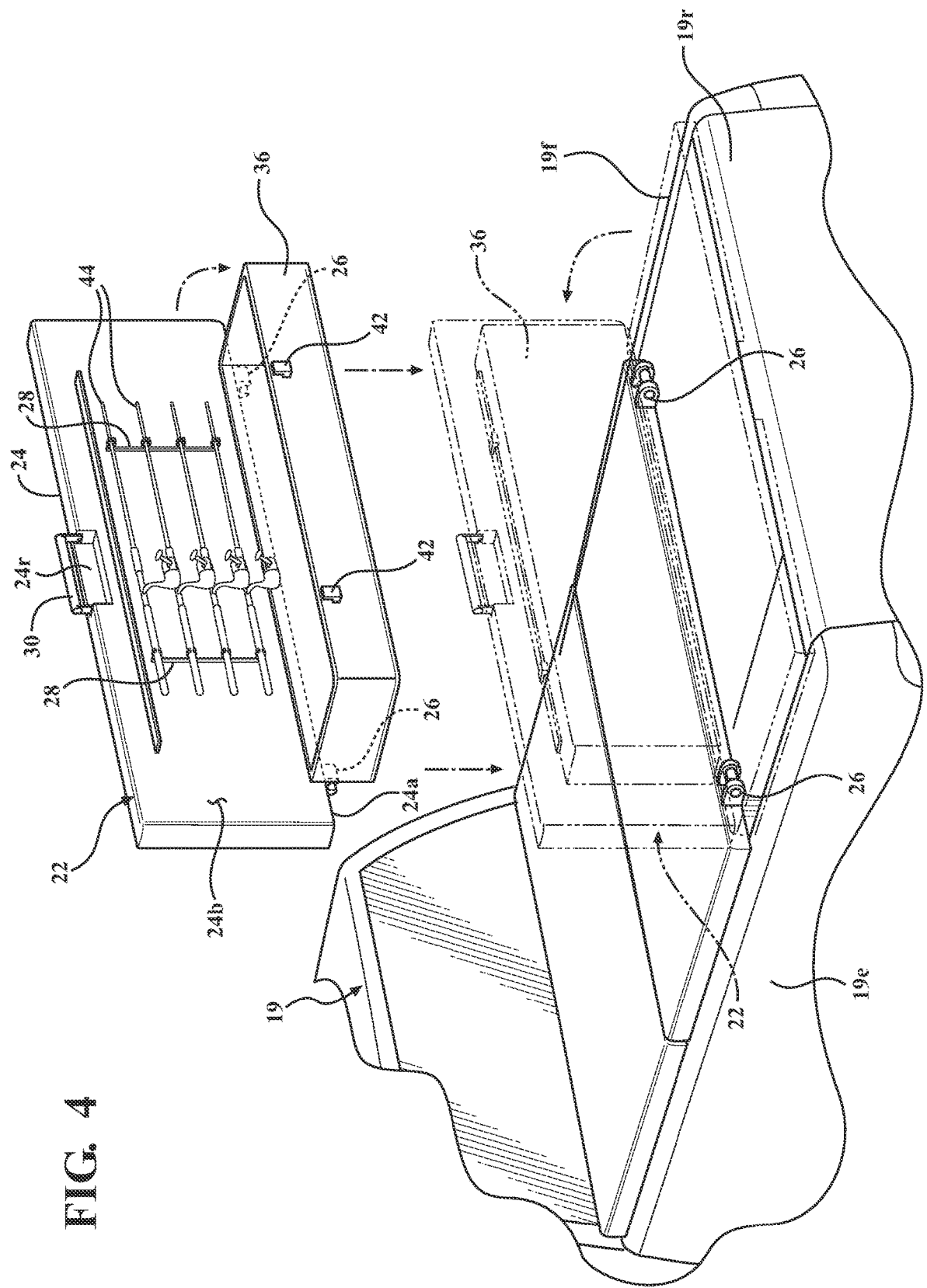
FIG. 4 is a schematic partially exploded view of the tonneau cover showing the tonneau cover panel assembly detached from the remainder of the tonneau cover and with the shield unlatched and rotated to an open position to expose objects mounted to the panel portion.

In particular embodiments, and as seen in FIGS. 3 and 4, the tonneau cover panel assembly 22 may be structured to be rotatably connectible to, and detachable from, at least one other panel of the tonneau cover 20. To this end, in one or more arrangements, the tonneau cover panel assembly 22 may include one or more open-ended hinges 26 attached to one or more associated edges 24a of the panel portion 24. As seen in FIGS. 3 and 4, open-ended hinge(s) 26 may enable the tonneau cover panel assembly 22 to be rotated between a first, closed orientation 22' (shown in solid lines in FIG. 3) covering a portion of the cargo bed 19a, and second, raised orientation 22" (shown partially in phantom lines in FIG. 3) exposing a portion of the cargo bed interior. A conventional bulb-type seal 32 may be attached to the adjacent panel 20b and structured so that a seam between the panel 20b and the panel assembly 22 will be sealed when the panel assembly 22 is in the closed orientation.

The open-ended hinge(s) 26 may be structured so that, after the tonneau cover panel assembly 22 has been rotated in direction D1 away from its mounting position on the uppermost edge of the tailgate 19t, the tonneau cover panel assembly 22 may be detached from an adjacent tonneau cover panel 20b to which it is rotatably connected. Any of a variety of alternative hinge structures may be used to detachably rotatably connect the tonneau cover panel assembly 22 to other tonneau cover panels.

Referring to FIGS. 3 and 4, at least one mounting bracket 28 may be attached to an interior side 24b of the panel portion 24. The interior side 24b of the panel portion 24 may be a side facing toward an interior of the cargo bed when the tonneau cover panel assembly 22 covers a portion of the cargo bed 19a. The embodiment illustrated in the drawings shows several mounting brackets 28 attached to the panel portion 24 along the panel portion inner surface. As shown in FIG. 4, the mounting bracket(s) 28 may be structured to enable mounting of one or more objects thereon. Examples of objects which a mounting bracket 28 may be structured to hold include rifles, fishing poles, tools, and other items. The panel portion interior side 24b may be provided with attachment cavities or other attachment structures (not shown) designed to enable any of a variety of mounting brackets 28 of different structures to be arranged along the interior side 24b according to user preferences.

In one or more arrangements, a recess 24r may be formed in the panel portion 24, and a handle 30 may be connected to the panel portion 24 inside the recess 24r and structured to be positionable to reside entirely within the recess when the tonneau cover panel assembly 22 is mounted to a vehicle 19 as shown in FIGS. 1 and 3. In particular arrangements, the handle 30 is rotatably connected to the panel portion 24 inside the recess 24r and may be rotatable to reside completely within the recess. In other arrangements, the handle 30 may be connected to the panel portion 24 using opposed slots or grooves enabling the handle 30 to be retracted into the recess 24r when the handle is not in use.

The tonneau cover panel assembly 22 may be considered to be mounted to a vehicle when the tonneau cover 20 is positioned on tops of the opposed walls 19e, 19f and the tailgate 19t of the cargo bed 19a in an end-use position of the tonneau cover 20 so that the tonneau cover panel assembly 22 covers an associated portion of the cargo bed 19a. the portion of the cargo bed 19a covered by the tonneau cover panel assembly 22 in the end-use position of the tonneau cover 20 may depend on the position of the tonneau cover panel assembly 22 in relation to other panels of the tonneau cover 20. for example, if the tonneau cover panel assembly 22 is attached to another tonneau cover panel so as to form an end portion of the tonneau cover as shown in FIGS. 1, 3, and 4, the tonneau cover 20 may be considered to be mounted to the vehicle 19 in its end-use position when the tonneau cover panel assembly 22 covers an associated end of the cargo bed 19a and the other panels 20a, 20b of the tonneau cover the middle and opposite end portions of the cargo bed, as shown in FIG. 1. Alternatively, the tonneau cover panel assembly 22 may be structured to be detachably rotatably connectible to end panels of the tonneau cover along both of opposite edges of the panel portion 24, in which case the tonneau cover panel assembly may be structured to cover a central portion of the cargo bed 19a when the tonneau cover 20 is mounted to the vehicle 19.

In one or more arrangements, a shield 36 may be attached to the panel portion interior side 24b. The shield 36 may be a relatively rigid structure configured to enclose the mounting brackets 28 when the shield 36 is in a closed condition. The shield 36 may be in a closed condition when edges 36a of the shield are in contact with the panel portion interior side 24b as shown in FIG. 3. Contact between the shield 36 and the panel portion 24 along the shield edges 36a may seal the interior of the shield 36 and prevent objects mounted on the mounting brackets 28 from exposure to dirt, mud, etc. When closed, the shield 36 may also protect mounted objects from damage due to impact with loose objects lying in the cargo bed 19a. Such unsecured objects may be thrown off the cargo bed floor and into the mounted objects when, for example, the vehicle 19 rides over bumps or into potholes in the road surface. In particular arrangements, the shield 36 may be detachably connected to the panel portion 24 using latches, clips, mechanical fasteners, or any other suitable method.

In the arrangement shown in the drawings, the shield 36 is detachably connected to the panel portion using one or more hinge assemblies 38. In particular arrangements, each hinge assembly 38 may include a connecting plate 38a affixed to the shield 36, a hinge plate 38b, and a hinge 38c rotatably connecting the connecting plate 38a and the hinge plate 38b to enable rotation therebetween. A hinge receptacle 38r may be affixed to the panel portion interior side 24b at a location where it is desired to connect a hinge plate 38b to the panel portion 24. The hinge receptacle 38r may define a cavity 38t structured to receive an associated hinge plate 38b therein.

To detachably connect the hinge plate 38b to the panel portion 24, the hinge plate 38b may be inserted into the hinge receptacle cavity 38t. the hinge receptacle 38r secures the hinge plate 38b to the panel portion 24, thereby permitting the shield 36 rotatably attached to the hinge plate 38b to be rotated, to open and close the shield.

A latch plate 40 may extend from the panel portion interior side 24b at a location structured to abut or reside close to the tailgate 19t when the tailgate is closed, as shown in FIG. 3. Portions of one or more latches 42 may be mounted to the latch plate 40. Complementary portions of the latches 42 may be mounted to edge(s) 36a of the shield 36 structured to abut or reside adjacent the latch plate 40 when the shield 36 is in a closed condition as shown in FIG. 3. This enables the latches 42 to be engaged when the shield 36 is closed, to maintain the shield in the closed condition. The latches 42 may be in the form of conventional buckles or any other suitable form.

FIG. 4 shows a partially exploded view of the tonneau cover 20 illustrating the tonneau cover panel assembly 22 detached from the remainder of the tonneau cover and with the shield 36 unlatched and rotated to an open position to expose the objects (in this case, fishing poles 44) mounted to the panel portion 24.

Any of the tonneau cover constituents described herein may be formed from any suitable material or materials (for example, polymers, metals, etc.) using any suitable methods, such as molding, forming, stamping, etc.

The tonneau cover panel assembly 22 may be easily attached to at least one other tonneau cover panel to serve as a portable carrying case for any of a variety of objects attachable to the tonneau cover panel assembly. When attached to other tonneau cover portion(s), the tonneau cover panel assembly 22 may function as part of the tonneau cover to cover a portion of the cargo bed.

The tonneau cover panel assembly described herein also enables space above the floor of the cargo bed to be utilized for cargo transport, thereby enabling relatively fragile or breakable items to be separated from other items in the cargo bed and preventing collisions between the fragile items and other cargo items. Also, since the objects are mounted along an interior side 24b of the panel portion 24, the objects to not impede tonneau cover aerodynamic performance. In addition, the objects are not visible when the tonneau cover 20 is mounted to cover the cargo bed 19a, thereby reducing the risk of theft.

Furthermore, the optionally-attachable and easily-openable/removable shield 36 may protect mounted objects from damage both when the tonneau cover panel assembly 22 is mounted to the vehicle as part of the tonneau cover and after the tonneau cover panel assembly 22 has been detached from the other tonneau cover panels and removed from the vehicle 19.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A detachable tonneau cover panel assembly comprising:
    a panel portion structured to be detachably connectible to a panel of a tonneau cover;
    at least one mounting bracket attached to an interior side of the panel portion and structured to enable mounting of an object thereon; and
    a shield structured to enclose the at least one mounting bracket and structured to be detachably connectible to the panel portion.

2. The tonneau cover panel assembly of claim 1 wherein the shield is structured to be detachably rotatably connectible to the panel portion.

3. The tonneau cover panel assembly of claim 2 further comprising:
    at least one hinge plate structured to be rotatably attached to the shield; and
    at least one hinge receptacle attached to the panel portion and structured to receive a portion of the at least one hinge plate therein.

4. The tonneau cover panel assembly of claim 1 further comprising:
    a recess formed in the panel portion; and
    a handle connected to the panel portion inside the recess and structured to be positionable to reside entirely within the recess when the tonneau cover panel assembly is mounted to a vehicle.

5. A tonneau cover including a detachable tonneau cover panel assembly in accordance with claim 1.

6. A tonneau cover including the detachable tonneau cover panel assembly in accordance with claim 1.

* * * * *